N. SAITO.
PEDAL FOR CYCLES, MOTORCYCLES, AND THE LIKE.
APPLICATION FILED JULY 11, 1919.

1,362,145.

Patented Dec. 14, 1920.

Inventor:
Nakaji Saito,
By H. R. Kerslake
Attorney

UNITED STATES PATENT OFFICE.

NAKAJI SAITO, OF TOKYO, JAPAN.

PEDAL FOR CYCLES, MOTORCYCLES, AND THE LIKE.

1,362,145.     Specification of Letters Patent.     Patented Dec. 14, 1920.

Application filed July 11, 1919. Serial No. 310,158.

*To all whom it may concern:*

Be it known that I, NAKAJI SAITO, a subject of the Empire of Japan, residing at No. 20, Aioi-Cho 4 Chome, Honjo-Ku, Tokyo, Japan, have invented new and useful Improvements in Pedals for Cycles, Motorcycles, and the like, of which the following is a specification.

My invention relates to improvements in pedals, wherein right and left coiled springs placed alternately to one another, are squarely combined together, the sides of the adjacent springs being connected together by rods which are passed through the same, thus making a strong basket-like square body. The object of the invention is to provide a strong pedal possessing great resiliency.

With the foregoing object outlined and with other objects in view which will appear as the description proceeds, the invention consists in the novel features hereinafter described in detail and illustrated in the accompanying drawing, and more particularly pointed out in the appended claims.

Referring to the drawing:—

Figure 1:
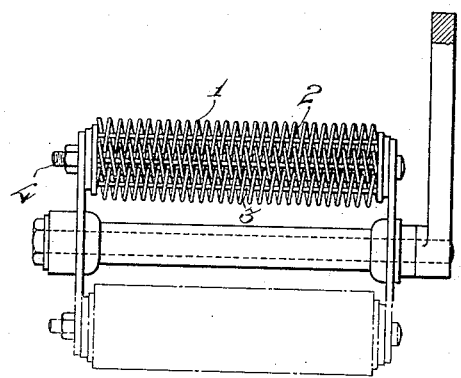
Figure 1 is a side view of the pedal.
Figure 2:
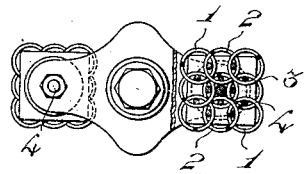
Fig. 2 is an end view partly in section.

The invention consists in alternately placing right and left coiled springs 1 and 2 in such manner as to cause the coils of one spring to extend into the spaces between the coils of adjacent springs, and in combining the springs together to form a square body as shown in Fig. 2. Supports 3 are placed through the eyes formed by the overlapping coils of adjacent springs for the purpose of securing the springs together, and an axle 4 is placed in the central spring. Thus a strong basket-like square body is provided for the pedal, and this body may be embedded in india rubber, if desired, to prevent slipping of the foot on the pedal.

A pedal constructed in the manner described above will possess great strength and resiliency.

What I claim and desire to secure by Letters Patent is:—

1. A pedal including an axle, a series of right and left coiled springs arranged alternately around said axle, and means for securing the adjacent coils of said springs together.

2. A pedal including an axle, a series of right and left coiled springs alternately placed around said axle, the coils of said springs overlapping, and rods passing through the overlapping portions of said springs for securing the same together.

3. A pedal including an axle, a coiled spring arranged around the same, a series of right and left coiled springs alternately placed around the first mentioned spring, the coils of adjacent springs being overlapped, rods passing through the overlapped portions of said springs, and a body of india rubber in which the springs are embedded.

In testimony whereof I have affixed my signature.

NAKAJI SAITO.